United States Patent [19]
Huss et al.

[11] Patent Number: 4,882,590
[45] Date of Patent: Nov. 21, 1989

[54] METHOD FOR LOCATING A RADIO FREQUENCY EMITTER

[75] Inventors: Ronald E. Huss, Los Angeles, Calif.; Ellis S. Feldman, Arlington, Va.

[73] Assignee: Hughes Aircraft Company, Los Angeles, Calif.

[21] Appl. No.: 195,740

[22] Filed: May 18, 1988

[51] Int. Cl.⁴ .............................................. G01S 3/02
[52] U.S. Cl. ..................................... 342/453; 342/398
[58] Field of Search ........................... 342/453, 398, 64

[56] References Cited

U.S. PATENT DOCUMENTS 4,746,924  5/1988  Lightfoot .............................. 342/453

Primary Examiner—Theodore M. Blum
Attorney, Agent, or Firm—Leonard A. Alkov; Wanda Denson-Low

[57] ABSTRACT

A radio frequency emitter transmits pulses in a regular swept beam pattern. As a result of this regular pattern, the angles of transmission of the pulses can be inferred. Intervisibility data of terrain points in a region around an observation point are stored in computer memory. At the observation point, measurements are made of the times of arrival of a plurality of terrain point reflections of a single pulse transmitted by the emitter. These measurements are repeated for a plurality of pulses transmitted by the emitter. In a computer, a comparison is made of the terrain points of reflection calculated from the measured times of arrival for assumed emitter locations with the stored intervisibility data of terrain points.

4 Claims, 9 Drawing Sheets

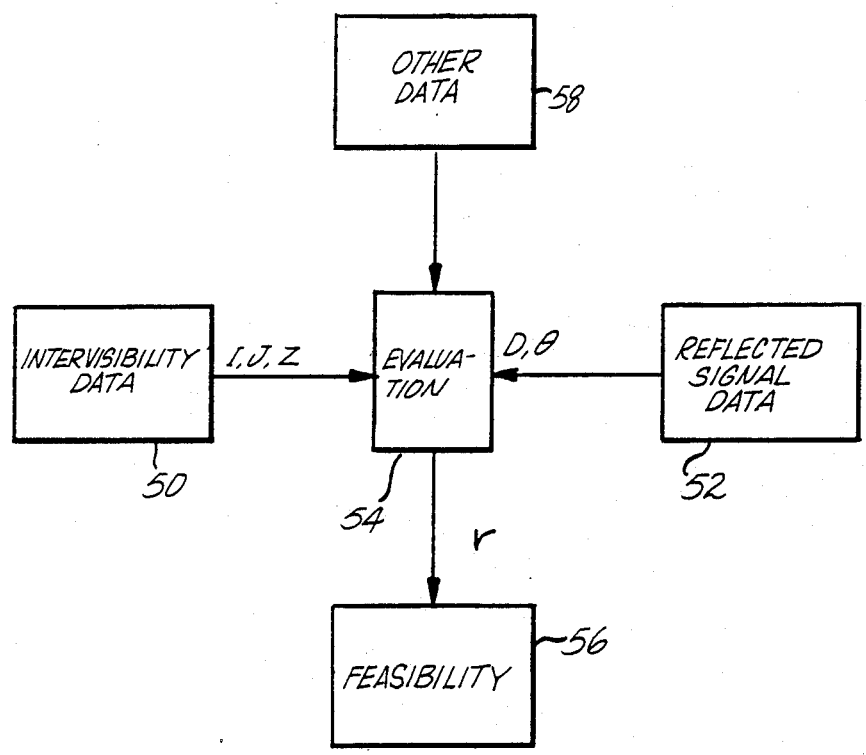

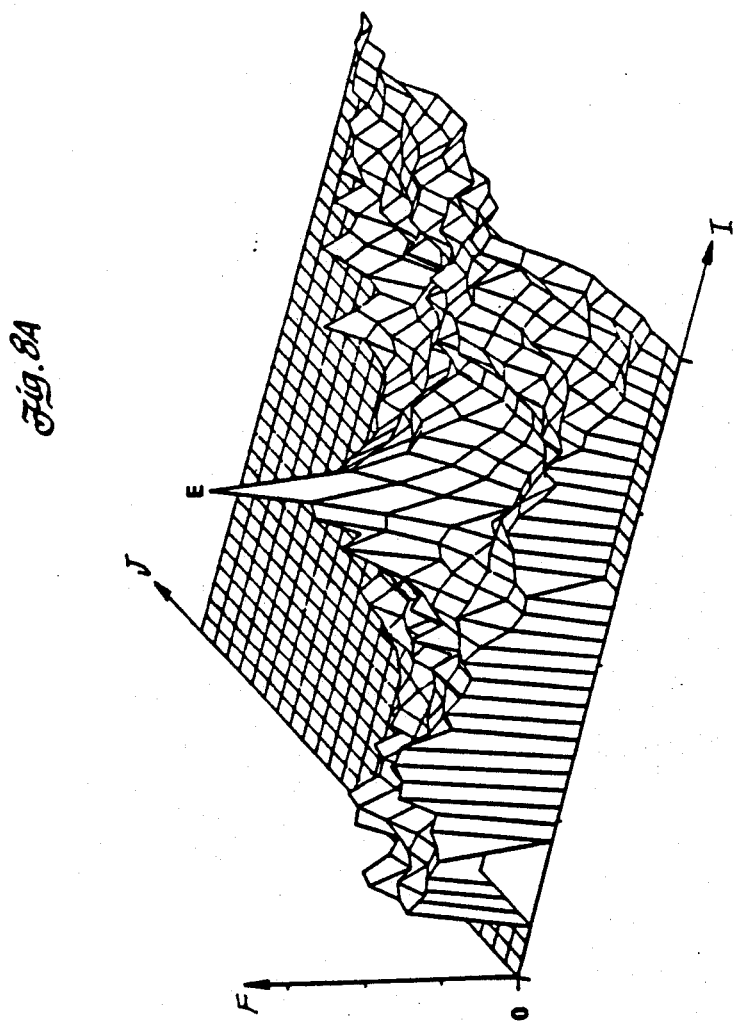

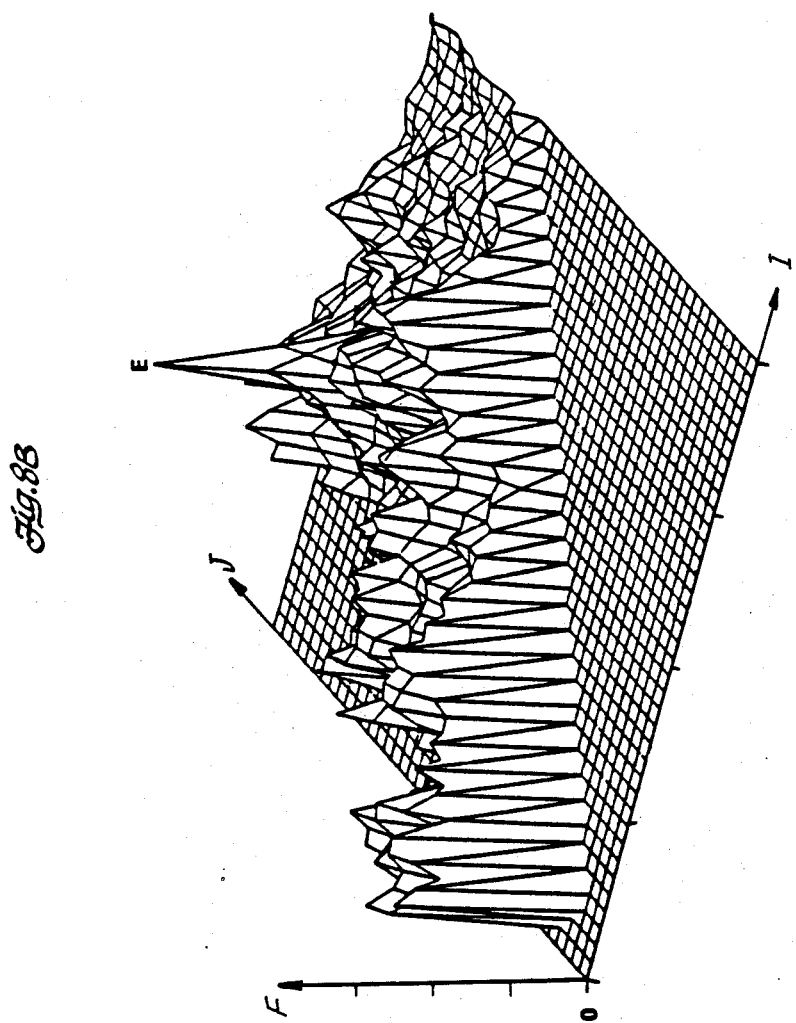

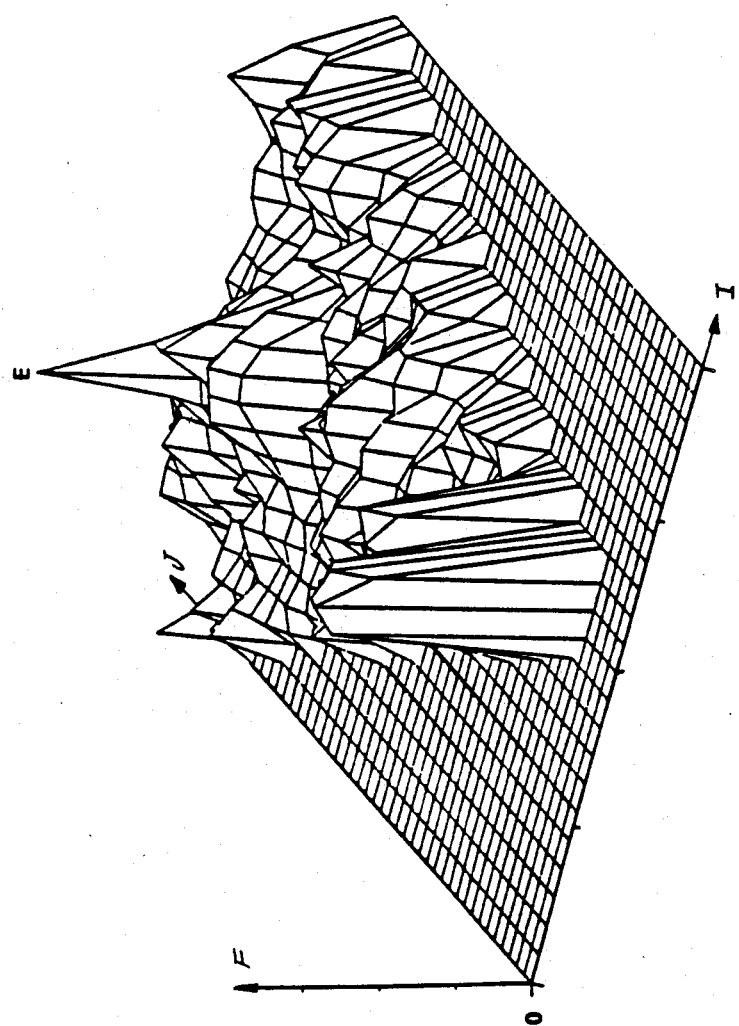

METHOD FOR LOCATING A RADIO FREQUENCY EMITTER

BACKGROUND OF THE INVENTION

This invention relates to a method for locating a radio frequency emitter that transmits pulses in a swept beam pattern.

In electronic warfare applications, the need arises to locate a radio frequency emitter that transmits pulses in a swept beam. Such a swept beam is usually produced by a rotating antenna, but could also be produced by an oscillating antenna. Current techniques for locating such an emitter require that the observation point lie in the line of sight of the emitter. This requirement means that an emitter can only be located when the observation point is exposed to attack from the emitter. The accuracy of some current techniques for locating a radio frequency emitter also depends upon precise angle measurements, which may be difficult to obtain.

SUMMARY OF THE INVENTION

The invention is a method for locating a radio frequency emitter at an observation point that does not have to be in a direct line of sight from the emitter by using terrain intervisibility data and the relative times of arrival of signals from a single pulse reflected from different points on the terrain at the observation point. The emitter transmits pulses in a regular swept beam pattern. As a result of this regular pattern, the angles of transmission of the pulses can be inferred. Intervisibility data of terrain points in a region around the observation point are stored in computer memory. At the observation point, measurements are made of the times of arrival of a plurality of terrain point reflections of a single pulse transmitted by the emitter. These measurements are repeated for a plurality of pulses transmitted by the emitter. In a computer, a comparison is made of the terrain points of reflection calculated from the measured times of arrival for candidate, i.e., assumed emitter locations with the stored intervisibility data of terrain points. Precise angle measurements are not required to locate a radio frequency emitter in this way.

BRIEF DESCRIPTION OF THE DRAWINGS

The features of a specific embodiment of the best mode contemplated of carrying out the invention are illustrated in the drawings, in which:

FIG. 7 is a schematic block diagram that illustrates the data used by a computer to locate an emitter in accordance with the principles of the invention; and FIGS. 8A, 8B, 8C and 8D are diagrams representing the feasibility of various emitter locations.

DETAILED DESCRIPTION OF THE SPECIFIC EMBODIMENT

Figure 1:
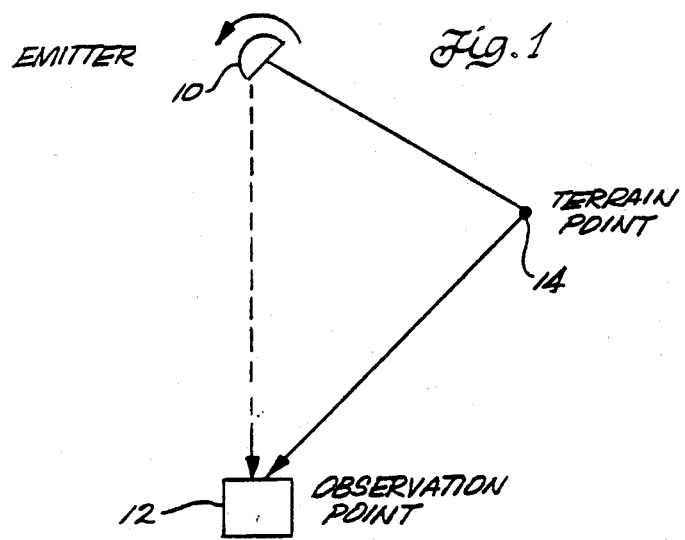
FIGS. 1 to 3 are diagrams illustrating spatial considerations used to explain the invention.

FIG. 1 is a schematic plan view of a terrain based emitter 10 to be located relative to an observation point 12. It is assumed that emitter 10 rotates at a constant angular velocity of 30° per second and transmits pulsed radio frequency waves, e.g., at 1.344 gigahertz, with a pulse repetition rate, e.g., of 450 pulses per second. It is also assumed that emitter 10 has a directional radiation pattern with a narrow main beam or lobe, e.g., 2° to 3°, and lower intensity side lobes. It is further assumed that the altitude of emitter 10 and observation point 12 through ground reflections and the terrain altitude therebetween is such that observation point 12 is not in a direct line of sight from emitter 10, i.e., observation point 12 is below the line of sight of emitter 10.

Observation point 12 could be a low flying aircraft, a ground site, or a ship on water. When the main beam of emitter 10 is not directed at observation point 12, some of the radio frequency energy from the side lobes reaches observation point 12 through ground reflections in a direct line, as depicted by the broken line in FIG. 1. Some of the radio frequency energy from the main beam also reaches observation point 12 after lateral reflection from terrain points, such as a point 14, as depicted by the unbroken line in FIG. 1. Thus, each pulse transmitted by emitter 10 reaches observation point 12 in the direct line path and thereafter reaches observation point 12 from a number of laterally reflective paths via various terrain points such as point 14. The time delays between the direct line pulse and the reflected pulses received at observation point 12 are indicative of the specific terrain points from which the delayed pulses are reflected. The longer the transmission path from emitter 10 to the terrain point of reflection and from there to observation point 12, the longer the time delay.

By analyzing the radio frequency energy received at observation point 12 from emitter 10, the angular velocity at which emitter 10 rotates, its pulse repetition rate, and its direction from observation point 12 as a function of time can be determined. Specifically, an extraordinarily large radio frequency energy pulse, hereafter called Peak of Beam (POB), is received at observation point 12 when the main beam of emitter 10 transmits in a direct line to observation point 12. Treating this direct line, i.e., the broken line in FIG. 1, as the angular reference for rotation of emitter 10, the approximate angular position of the main beam of emitter 10 at the time of reception of each direct line pulse at observation point 12 can be inferred. This pulse is, in general, detectable even though the observer does not have direct line of sight to the emitter. Thus, assuming counterclockwise rotation of emitter 10, after 675 pulses from POB, emitter 10 is at an angle of 45° and after 1350 pulses from POB, emitter 10 is at an angle of 90 °.

Figure 2:
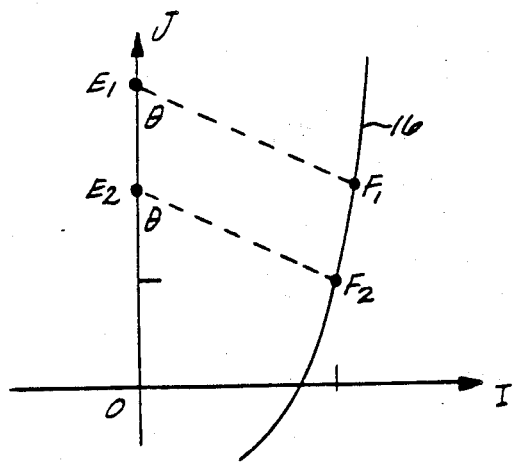

In FIG. 2, point O represents observation point 12 and points $E_1$ and $E_2$ represent two emitter locations in the same direction from observation point 12 in a rectangular coordinate system having an I axis and a J axis. The coordinate system is defined so point O is at the origin and points $E_1$ and $E_2$ are on the J axis. A given pulse transmitted when the main beam is at an angle $\theta$ and arriving at point O after a specified time delay would be reflected from a terrain point $F_1$ if emitter 10 were located at point $E_1$ and would be reflected from a terrain point $F_2$ if emitter 10 were located at point $E_2$. Thus, for a particular angle $\theta$, and a specified time delay, there is a locus of possible terrain points, represented as a line 16 corresponding to the possible emitter locations. For the particular angle $\theta$ and time delays there are different loci of terrain points, shifting downward and to the right in FIG. 2 with increasing time delay.

Figure 3:
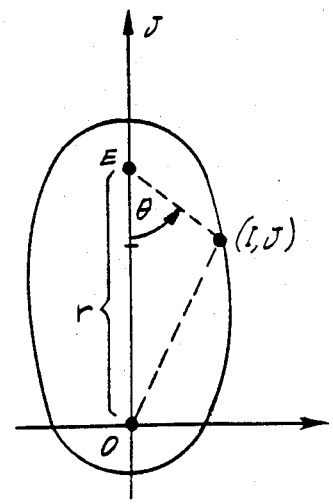

In FIG. 3, a single emitter location E is assumed. The distance between points E and O, which defines the emitter location relative to observation point 12, is represented by a distance r. θ is the angle of the main beam at the time of pulse transmission, I is one coordinate of a terrain point of reflection, and J is the other coordinate of the same terrain point of reflection. For a specific location of emitter 10, i.e., point E, and a variable angle θ, the locus of possible terrain points from which a reflected pulse could reach observation point 12, after a given time delay relative to a directly transmitted pulse is defined by an ellipse, as illustrated in FIG. 2, because the reflected transmission paths for all such terrain paths are the same. Thus, the delayed pulses received at observation point 12 correspond to ellipses increasing in size about points O and E with increasing time delay. This relationship is expressed by the equation:

$$\frac{4(Y - r/2)^2}{(r + D)^2} + \frac{4X^2}{(r + D)^2 - r^2} = 1 \quad (1)$$

where the difference between each reflected transmission path, i.e., the sum of the distance from point E to a point (I, J) and the distance from such point (I, J) to point O, and the direct transmission path r equals D. The pulse time delay, τ, equals D divided by the speed of light.

Furthermore, since the distance r equals the sum of the distance from point O to point (I, J) J and the distance from point J to point E, the relationship among I, J, r and θ can be expressed by the following equation:

$$Y = r - X \cot \theta \quad (2)$$

From equations (1) and (2), the coordinates of a point of reflection can be expressed in terms of the distance r, the angle of the main beam θ, and D, the difference between the reflected and direct transmission paths from point E to point O as follows:

$$X = \frac{(r + D/2) \sin \theta}{1 + r/D (1 - \cos \theta)} \quad (3)$$

$$Y = r - \frac{(r + D/2) \cos \theta}{1 + r/D (1 - \cos \theta)} \quad (4)$$

The additional information about emitter location that can be obtained from delays due to terrain reflections for successive pulses from the emitter at the assumed pulse repetition rate is not significant. Therefore, only a fraction of the pulses transmitted by the emitter are ordinarily processed in the practice of the invention. By way of example, every 30th pulse transmitted by the emitter could be processed. Thus, for every 2° rotation of θ, a set of time delay data is collected.

Figure 4:
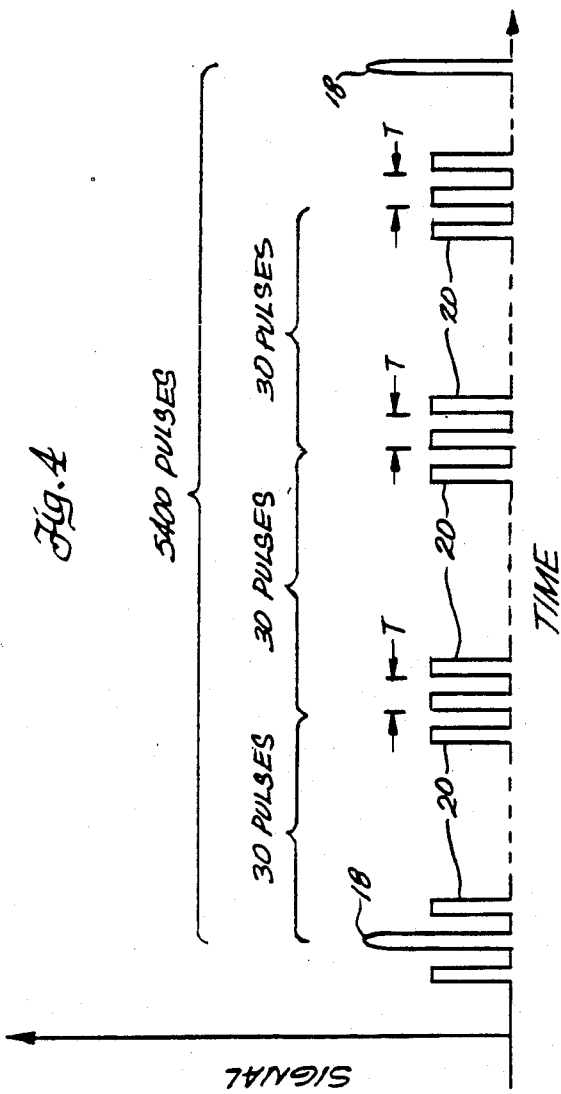
FIGS. 4 and 5 are waveforms illustrating time relationships used to explain the invention.

FIG. 4 represents the directly transmitted pulses from the emitter received at the observation point. Large pulses 18 represent the POB pulses transmitted at twelve second intervals. Pulses 20 represent the pulses directly transmitted at successive angular positions of the emitter between the POB pulses. For the assumed emitter characteristics, 5,400 pulses 20 appear between successive pulses 18. Each 30th pulse 20 is processed to derive information about the emitter location during a sampling interval T, e.g., 600 microseconds, which is less than the period between pulses 20.

Figure 5:
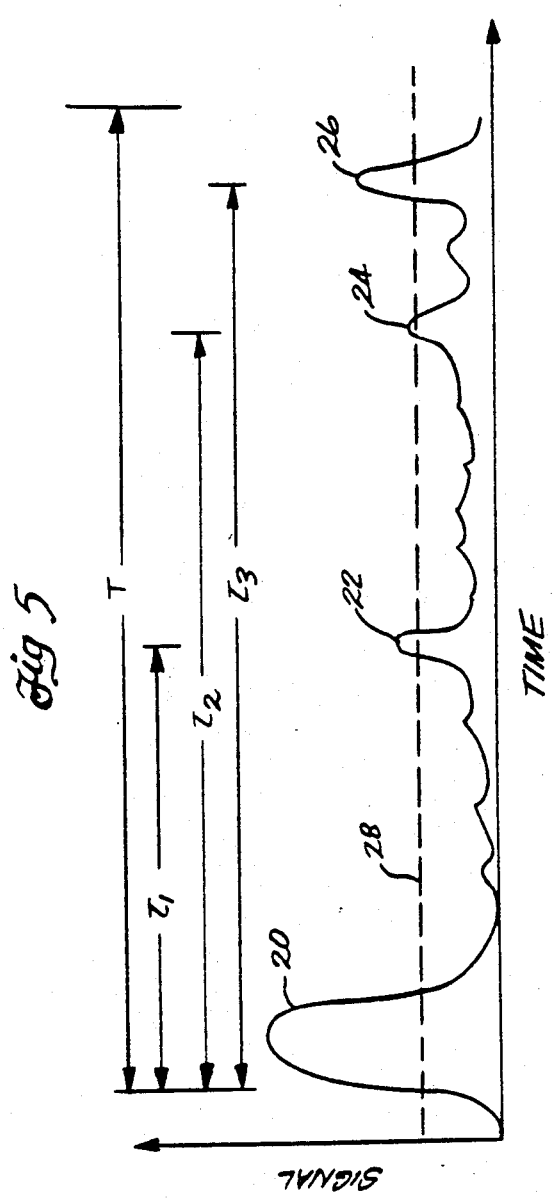

FIG. 5 represents the radio frequency energy from a single pulse received at the observation point from the emitter. Pulse 20, as before, is the directly transmitted pulse. Pulses 22, 24 and 26 are reflections from terrain points in the region around the observation point. A broken horizontal line 28 represents the threshold for discriminating between reflected pulses and noise. The time delay between pulses 20 and 22 is represented as $\tau_1$. The time delay between pulses 20 and 24 is represented as $\tau_2$. The time delay between pulses 20 and 26 is represented as $\tau_3$. Delays $\tau_1$, $\tau_2$, and $\tau_3$ are proportional to the transmission paths from the emitter to the observation points via the terrain points of reflection minus the direct transmission paths from the emitter to the observation point, i.e., r.

Figure 6:
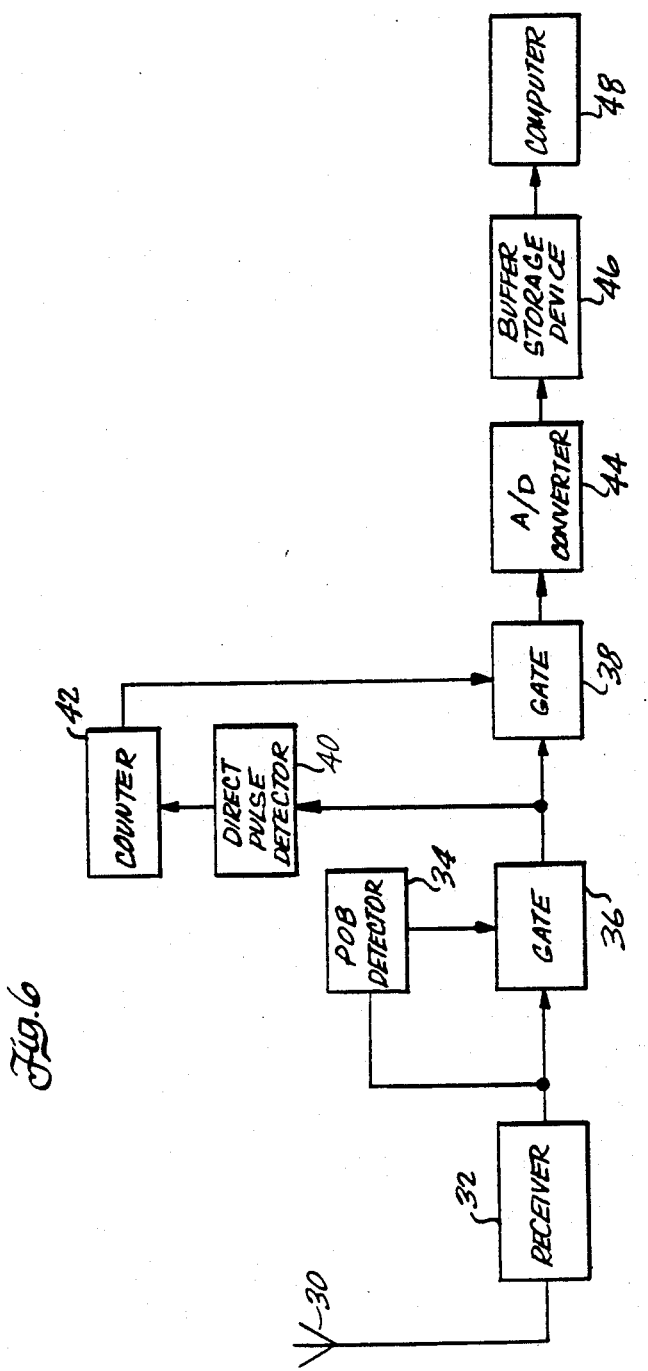
FIG. 6 is a schematic block diagram of apparatus for practicing the invention.
Figure 8C:
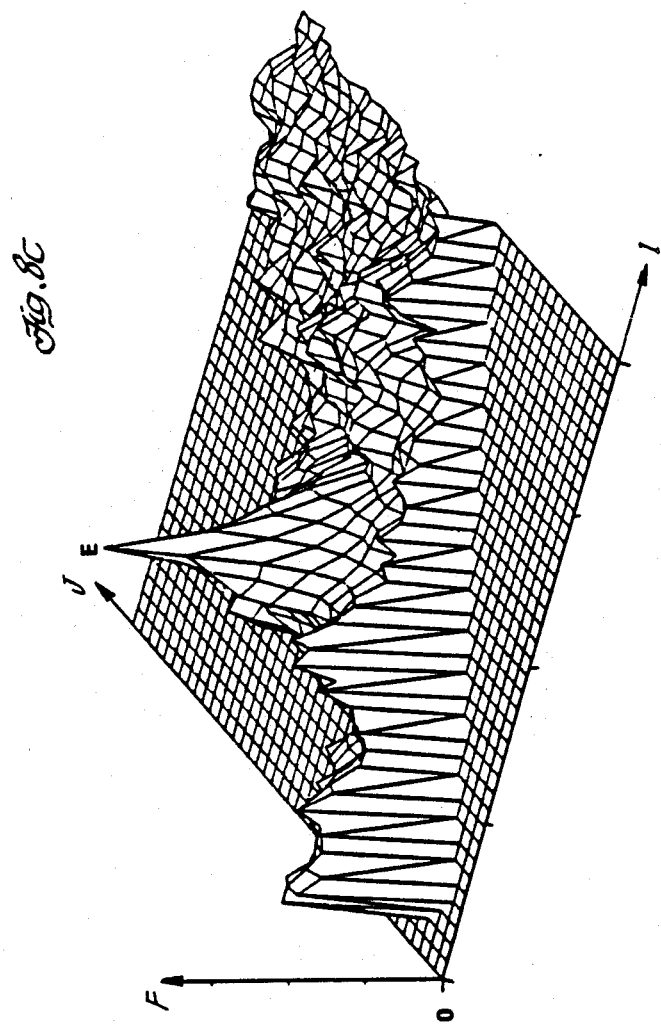

FIG. 6 illustrates apparatus for collecting and processing the pulses from the emitter at the observation point. The radio frequency energy is intercepted by an antenna 30 and fed to a receiver 32, which converts the radio frequency energy to intermediate frequency. A Peak of Beam (POB) detector 34 controls a transmission gate 36. With reference to FIG. 4, detector 34 opens gate 36 for the interval between two successive POB pulses 18, during which a total of 5,400 directly transmitted pulses pass from receiver 32 through gate 36 to a transmission gate 38. These pulses are sensed by a direct pulse detector 40 15 and applied to a counter 42. After every 30th pulse, counter 42 opens gate 48 for a sampling interval T. The resulting sample as represented in FIG. 5 is coupled to an analog to digital (A/D) converter 44, which digitizes a large number of samples, e.g., 3,000 samples at sampling intervals of 0.2 microsecond. The digitized samples are collected in a buffer storage device 46. After all the samples have been digitized they are transferred en masse to the memory of computer 48.

The emitter is located by comparing the time delays of the reflected pulses with intervisibility data stored in the memory of computer 48. For each terrain point (I, J) in the region around the observation point there are stored in the memory of computer 48 a value of masking depth, Z, i.e., the height above the terrain point that is visible from the observation point. For a description of a method for determining such intervisibility data, copending commonly assigned Application Ser. No. 07/179,711, filed on Apr. 11, 1988, by R. E. Huss and R. M. Denlinger, is incorporated fully herein by reference.

The invention of said application relates to data display and, more particularly, to a method for visually displaying intervisibility data relative to an observation point.

There are commercially available data bases of digitally stored terrain altitudes at grid points in terrestrial areas. Typically, such a data base comprises terrain altitudes in a square area of land mass of one degree latitude and one degree longitude, which is of the order of 100 km, and the grid points are spaced three arc seconds apart, which is of the order of magnitude of 100 meters.

One use of a terrain altitude data base is to determine intervisibility, i.e., whether a specified point on the surface of the earth is visible from an observation point, or if not, the height above the specified point that is visible from the observation point. There are presently computer algorithms for calculating intervisibility, i.e., line-of-sight between two points. These algorithms require complicated interpolation of the terrain altitude data base, essentially random access to the data base stored in computer memory, and a large number of calculations to develop intervisibility data relative to an observation point. The larger the terrestrial area under study the greater is the processing time required to make the intervisibility data available for visual display.

There are a number of uses for a visual display of intervisibility data, including artillery placement, short-range air defense, ground surveillance and threat avoidance. These uses become more appealing and varied as the time and computer complexity required to produce the data decreases.

The invention of said application Ser. No. 07/179,711 is a method for presenting intervisibility data relative to an observation point on or above the terrain. A data base of terrain altitudes is stored in computer memory. The data base comprises terrain altitudes at a grid of points in a selected terrestrial area encompassing the observation point. Visible heights from the observation point at the grid points are derived from the data base with a computer by performing a number of steps grid point by grid point in succession in an order moving away from the observation point. The first step is to determine a projected height at the grid point from the visible heights between the observation point and the grid point. The second step is to compare the projected height with the terrain altitude at the grid point. The third step is select as the visible height at the grid point the larger of the compared terrain altitude and the projected height. A number representative of the visible height at each grid point as so derived with the computer is stored in computer memory. Preferably, the stored number is the difference between the visible height and the terrain altitude, which is known as the masking depth. The computer memory is coupled to a visual display device to present a representation of the stored number in spatial relationship coordinated with the spatial relationship of the grid points of the terrestrial area. By deriving the numbers representative of visible height grid point by grid point in succession in an order moving away from the observation point, computer memory can be accessed in an ordered fashion to retrieve terrain altitude data and store numbers representative of visible height data and the calculations to derive the visible height data can be simplified by building upon the previously calculated visible height data.

In a preferred embodiment of the invention of said application Ser. No. 07/179,711, the visible height data is derived by use of the similar triangles theorem, i.e., similar triangles have proportional sides, and interpolation of previously calculated visible heights. Specifically, an intermediate terrain point is determined where a line from the observation point to the grid point in question crosses a line between the two closest intervening grid points. The visible height at the intermediate point is determined by interpolation of the visible heights at the closest intervening grid points based on the distance of the intermediate terrain point therefrom. The projected height at the grid point in question is then determined by similar triangles—one triangle is defined by the observation point, the intermediate point and the visible height at the intermediate point and the other triangle is defined by the observation point, the grid point in question and the projected height. In this way, the projected height is determined without use of trigonometric relationship or other complex calculations. Computer 48 compares terrain points of reflection (I, J) calculated from the measured times of arrival of a pulse transmitted by the emitter using equations (3) and (4) for candidate, i.e., assumed emitter locations, r, with the stored intervisibility data of terrain points (I, J). From this comparison, emitter locations corresponding to some terrain points (I, J) can be eliminated from consideration for the location of the emitter, because of the intervisibility data at such terrain points. For example, the masking depth at a particular terrain point might be so high that a reflection from such terrain point to the observation point would be virtually impossible.

Alternatively, the masking depth at a particular terrain point might be near zero or the terrain point may be visible from the observation point so that a pulse transmitted from an assumed emitter location could have been reflected from that terrain point with the time delay, $\tau$, of the signal received at the observation point; such an assumed emitter location is a good candidate for acceptance as the actual emitter location. By utilizing, in addition, other data about the terrain points such as reflectivity, intervisibility data between the terrain point and the assumed emitter location, and measured time delay data to other observation points, the evaluation of possible emitter locations, vis-a-vis the terrain points in the region around the observation point, can be further refined.

The process is depicted functionally in FIG. 7. Intervisibility data represented by a block 50, namely I, J, and Z, and reflected signal data represented by a block 52, namely D and $\theta$ are evaluated, as represented by a block 54. The result of this evaluation provides a feasibility of candidate emitter locations at the terrain points in the region about the observation point, as represented by a block 56. As represented by a block 58, other data can also be evaluated to refine the feasibility indication.

FIGS. 8A to 8D represent plots of feasibility of various emitter locations. The feasibility (F) is indicated on the vertical axis, and the terrain points of candidate emitter locations from the observation point (O) are indicated on the J and I axes. The feasibility (F) for each terrain point is determined by counting the number of reflections received at the observation point that could have been transmitted from each terrain point, assuming that it was the emitter location, based on the comparison of time delays of reflected pulses with intervisibility data. The highest value of feasibility (F) occurs at the likely emitter location (E). Thus, FIGS. 8A to 8D depict a scoring function of the possible emitter locations based on the described comparison of the time delays of the reflected pulses with the intervisibility data. Different measures of scoring, i.e., evaluating these comparisons, could be employed to further refine the feasibility data.

Reference is made to Appendix A for a program listing of software for evaluating candidate emitter locations in the described manner on a Digital Equipment Corporation VAX/VMS, Version V4.6 computer.

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. A method for locating a radio frequency emitter that transmits pulses in a swept beam pattern comprising the steps of:

storing intervisibility data of terrain points in a region around an observation point;

measuring at the observation point the times of arrival of a plurality of terrain point reflections of a single pulse transmitted by the emitter;

repeating the measuring step for a plurality of pulses transmitted by the emitter; and comparing terrain points of reflection calculated from the measured times of arrival for assumed emitter locations with the stored intervisibility data of terrain points.

2. The method of claim 1, in which the measuring step comprises measuring the times of arrival of the plurality of terrain point reflections relative to the time of arrival of the single pulse directly from the emitter.

3. The method of claim 1, in which the repeating step measures a fraction of the pulses transmitted by the emitter.

4. The method of claim 1, additionally comprising the steps of storing reflectivity data of terrain points in the region and comparing the terrain points of reflection calculated from the measured times of arrival for assumed emitter locations with the stored reflectivity data of terrain points.

* * * * *